United States Patent [19]

Nease et al.

[11] Patent Number: 4,964,138

[45] Date of Patent: Oct. 16, 1990

[54] DIFFERENTIAL CORRELATOR FOR SPREAD SPECTRUM COMMUNICATION SYSTEM

[75] Inventors: Greg A. Nease, East Windsor, N.J.; Peter K. Cripps, New Hope, Pa.

[73] Assignee: Agilis Corporation, Mountain View, Calif.

[21] Appl. No.: 271,614

[22] Filed: Nov. 15, 1988

[51] Int. Cl.⁵ .............................................. H04L 1/02
[52] U.S. Cl. ........................................................ 375/1
[58] Field of Search ............................................ 375/1

[56] References Cited

U.S. PATENT DOCUMENTS

| | | | |
|---|---|---|---|
| 3,337,803 | 8/1967 | Costas et al. | 375/1 |
| 3,864,635 | 4/1975 | Ewanus | 375/1 |
| 3,917,999 | 11/1975 | Gutleber | 375/1 |
| 4,112,372 | 9/1978 | Holmes et al. | 375/1 |
| 4,214,209 | 7/1980 | Baier et al. | 375/1 |
| 4,291,409 | 9/1981 | Weinberg et al. | 375/1 |
| 4,291,410 | 9/1981 | Caples et al. | 375/1 |
| 4,387,465 | 6/1983 | Becker | 375/1 |
| 4,423,517 | 12/1983 | Danno et al. | 375/1 |
| 4,545,061 | 10/1985 | Hileman | 375/1 |
| 4,561,089 | 12/1985 | Rouse et al. | 375/1 |
| 4,567,588 | 1/1986 | Jerrim | 375/1 |
| 4,649,549 | 3/1987 | Halpern et al. | 375/1 |
| 4,653,069 | 3/1987 | Roeder | 375/1 |
| 4,672,658 | 6/1987 | Kauehrad et al. | 375/1 |
| 4,760,586 | 7/1988 | Takeda | 375/1 |

*Primary Examiner*—Salvatore Cangialosi
*Attorney, Agent, or Firm*—Skjerven, Morrill, Macpherson, Franklin & Friel

[57] ABSTRACT

A spread spectrum communications system includes an encoder for differentially encoding a spread spectrum spreading code sequence in accordance with an input data signal. Each chip of the spreading code sequence is inverted, or not inverted, relative to the polarity of a corresponding chip of the spreading code sequence a fixed time delay previously, depending on whether the input data is a logic one or zero, respectively. At the receiver, the data is recovered in a differential data decoder wherein the presently received chip of the spread spectrum signal and a corresponding previously received chip of spread spectrum signal, received a fixed time delay previously, are compared one chip at a time. Since it is the spreading code sequence that is differentially encoded and differentially decoded, there is no need for a synchronized code sequence generator at the receiver, and data synchronization is achieved after one cycle time of the received spread spectrum spreading code sequence has elapsed.

9 Claims, 4 Drawing Sheets

DIFFERENTIAL CORRELATOR FOR SPREAD SPECTRUM COMMUNICATION SYSTEM

FIELD OF THE INVENTION

This invention relates to spread spectrum communication systems. In particular, this invention relates to a data correlator for use in spread spectrum communication systems.

BACKGROUND OF THE INVENTION

Spread spectrum systems are well known. In a spread spectrum data communication system, the individual data bits are modulated with a code sequence, called a spreading code sequence. The individual bits in the spreading code sequence are called chips. In order to transmit each data bit in a spread spectrum communication system, each individual data bit is first multiplied by the spreading code sequence in an exclusive OR gate.

Thus for example, for a data bit of zero, the spreading code itself is transmitted; while for a data bit of one, the inverse of the spreading code is transmitted. Since the spreading code has a higher clock rate than the data, the resulting signal has a higher frequency content i.e., a higher bandwidth than the original data signal. Specifically, the clock rate of the spread spectrum signal will be higher than that of the input data by the chosen spectrum spreading ratio. Thus, the spread spectrum signal energy content is more dispersed throughout the frequency spectrum. Spread spectrum communication systems are therefore less susceptible to noise and interference as well as have greater resistance to multipath distortion delays.

At the receiver, the spreading code sequence is detected in order to recover the original transmitted data. The general problem in spread spectrum systems is to correlate the received signal with the knowledge of the original spreading code sequence. Detection of the spreading code typically corresponds to the reception of a first logic level, while detection of the inverse of the spreading code corresponds to detection of the opposite logic level. In the prior art, there are many types of code correlators for detecting a received spreading code.

In one prior art approach, the signal is applied to an analog delay line and compared in parallel fashion using programmable analog inverters and adders programmed with a stored version of the spreading code. In operation, the analog delay line tap outputs are inverted or not, according to the spreading sequence in use. When the incoming signal lines up in time with the inverter programming, all outputs will add to produce a one chip long correlation spike. This process is known mathematically a autocorrelation.

The analog delay line, inverters and adders can be combined on a single surface acoustic wave (SAW) device. The latter approach can be costly, especially for small production quantities, and it is difficult to reprogram the SAW for different spreading code sequences. Fully digital correlators are available from such companies as TRW Inc., but they are expensive and use a considerable amount of power.

Another method of correlating the received signal with the original spreading code sequence is to synchronize a local code sequence generator with the incoming signals. In the latter case, considerably less hardware is required. If the received signal is digitized before being applied to the correlator, then a single exclusive OR gate can be used to compare the incoming signal to the output of the local synchronized code generator. The problem then becomes one of synchronizing the local code generator to the code generator in the transmitter. However, sequence synchronization can take many bits to achieve, adding to the overhead needed for the operation of a packet protocol, and in some cases, making existing protocols very difficult to implement.

In these circumstances, it would be desirable to find a spread spectrum technique which offers the low cost of a synchronized receiver, while providing very short synchronization time.

SUMMARY OF THE INVENTION

In the present invention, a spreading code sequence is differentially encoded in accordance with an input data signal.

Specifically, if the input data signal is a one, the present chip of the spreading code sequence is inverted relative to a corresponding chip of the spreading code sequence a fixed time delay previously. If the input data signal is a zero, the present chip of the spreading code sequence is not inverted relative to a corresponding chip of the spreading code sequence a fixed time delay previously. In other words, the polarity of the spreading code sequence is either inverted or not inverted relative to the polarity of the spreading code sequence a fixed time period previously, depending on whether the input data signal is a one or zero, respectively.

At the receiver, in accordance with the present invention, each received chip of the spreading code sequence is compared with the corresponding chip of the previously received spreading code sequence. Since the spreading code sequence was originally differentially encoded at the transmitter, if the received chip of the spreading code sequence and the corresponding chip of the previously received spreading code sequence are the same, then the received data is a zero logic level. Conversely, if the received chip of the spreading code sequence is the inverse of the corresponding chip of the previously received spreading code sequence, then the received data is a one logic level.

It is not necessary that the time duration of one input data bit be equal to the time duration of one cycle of the spread spectrum spreading code sequence. In general, the number of chips per data bit may be less than, equal to, or greater than the number of chips in the spread spectrum spreading code sequence. In all cases, however, both in the transmitter encoding process, and in the receiver correlation process, each chip is compared to the corresponding chip of the previous spreading code sequence.

It is noted that by use of the present invention, there is no need for a sequence generator at the receiver, and the entire data correlator is simple in operation and low in cost. Furthermore, synchronization of the receiver is achieved after one cycle of the spreading code sequence.

DETAILED

Figure 1:
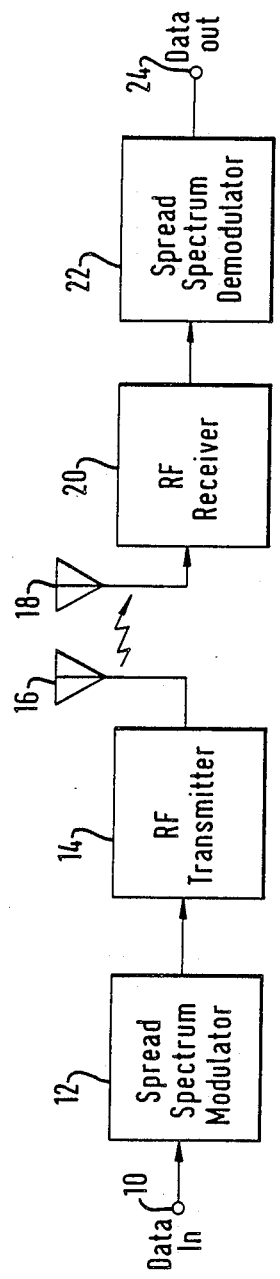
FIG. 1 shows a block diagram of a general purpose spread spectrum communication system embodying the present invention.

A generalized illustration of a data communication system is shown in FIG. 1. It is intended that data input at terminal 10 will be transmitted through the system and be available as data output on terminal 24.

Data input at terminal 10 is applied to spread spectrum modulator 12 which is in turn input to RF transmitter 14. The output of RF transmitter 14 is applied to a transmitting antenna 16. After the transmission through a suitable medium and reception by receiving antenna 18, the signal is applied to RF receiver 20. The output of RF receiver 20 is applied to a spread spectrum demodulator 22 in order to recover the original data.

Figure 2:
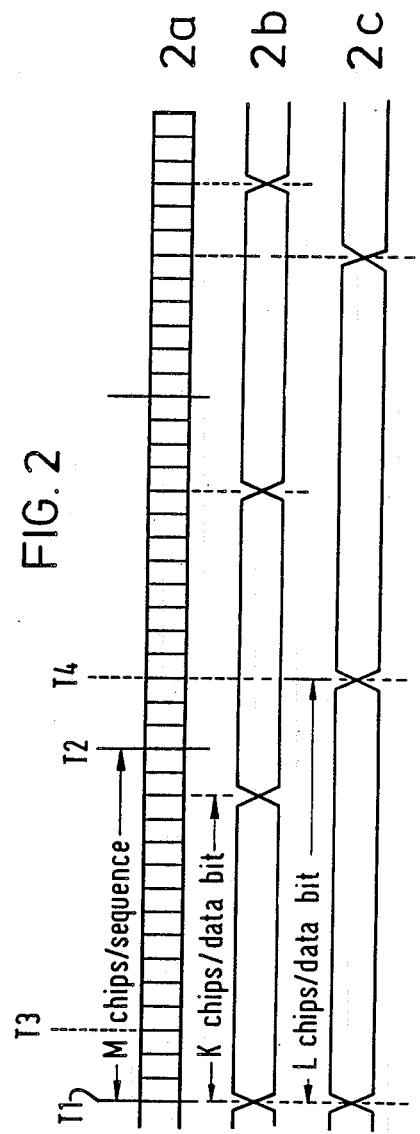
FIGS. 2a, 2b, and 2c are a time diagram illustrating a spreading code sequence which may be used in conjunction with the present invention.

The spread spectrum modulator 12 contains a sequence generator in order to provide a spreading code sequence. As illustrated in FIG. 2a, the sequence generator produces a repeating sequence M chips in length starting at time T1 and ending at time T2. Methods for generating repeating code sequences, such as maximal length pseudo random code generators, are well known in the art and form no part of the present invention. Also, as noted in FIG. 2a, since the sequence is repeating every M chips, it makes no difference where the sequence begins and ends so long as there are M chips per cycle of the sequence. Thus, time T3 may be the starting time of the sequence, and time T4 the ending time.

Figure 3:
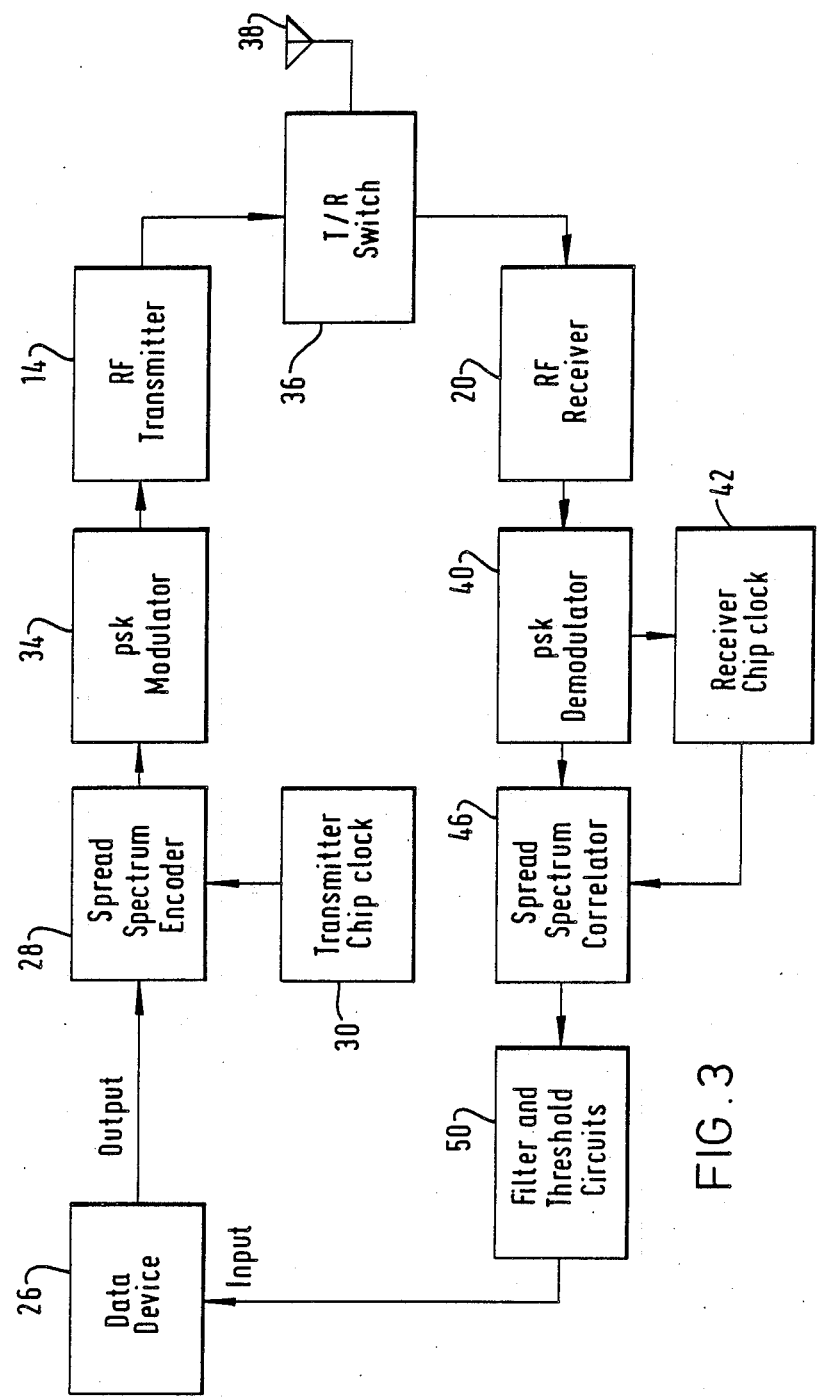
FIG. 3 is a block diagram of a spread spectrum modem including a spread spectrum transmitter and a spread spectrum receiver in accordance with the present invention.

The number of chips per data bit, however, need not be equal to the number of chips per spreading code sequence As illustrated in FIG. 2b, the number of chips per data bit may be less than the number of chips per cycle of the spreading code sequence, or, as illustrated in FIG. 2c, the number of chips per data bit may be greater than the number of chips per cycle of the spreading code sequence Regardless of the number of chips per data bit, the transitions of the data bits should be coincident with the transitions of the individual chips Thus, in FIG. 2b, the data transition at T1 is coincident with the system chip clock, and in FIG. 2c, the data transition at T4 is also coincident with the system chip clock A block diagram of a spread spectrum radio modem for transmitting and receiving digital data is shown in figure 3. The transmitter portion comprises spread spectrum encoder 28, transmitter chip clock 30, PSK modulator 34 and RF transmitter 14. The receiving portion comprises RF receiver 20, PSK demodulator 40, receiver chip clock 42, spread spectrum correlator 46 and filter and threshold circuits 50. The transmit/receive switch 36 permits an antenna 38 to be shared between the transmitter and receiver.

Data output from a data device 26 which may be a computer or a computer terminal is applied to spread spectrum encoder 28. Output of the spread spectrum encoder 28 which has been increased in bandwidth due to the higher frequency transmitter chip clock, is applied to PSK modulator 34 and RF transmitter 14 for transmission through transmit/receive switch 36 and to antenna 38.

In the receive mode, transmit/receive switch 36 connects antenna 38 to RF receiver 20. The output of RF receiver 20 is applied to PSK demodulator 40. The receiver chip clock 42 is derived from the received spread spectrum signal in PSK demodulator 40.

The reconstruction or derivation of the receiver chip clock 42 from the signal received at PSK demodulator 40 is well known to those skilled in the art and forms no part of the present invention. The recovered receiver chip clock is applied to spread spectrum correlator 46 as is the output of PSK demodulator 40. Within the spread spectrum correlator 46, the received signal is correlated with the spreading code sequence which was used in the transmitter, in order to derive the received data. The output of correlator 46 is connected to filter and threshold circuits 50 which provide a data input to the data device 26.

Figure 4:
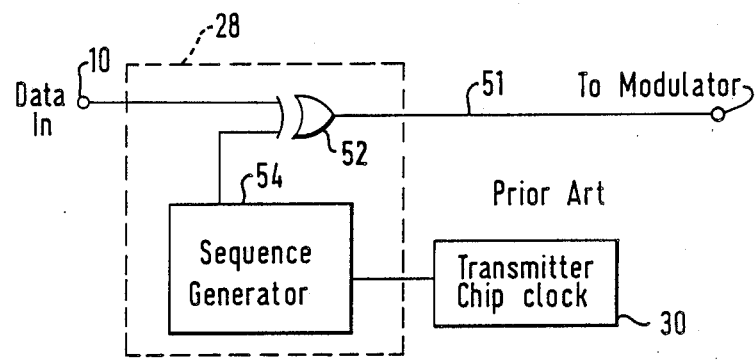
FIG. 4 is a prior art spread spectrum data encoder.

A typical prior art spread spectrum encoder 28 is shown in FIG. 4. The encoder 28 consists of an exclusive OR gate 52 having one input connected to the data input terminal 10. The other input of exclusive OR 52 gate is connected to the output of a sequence generator 54 which is driven by the transmitter chip clock 30. The output of exclusive OR gate 52 on conductor 51 is the output fed to the PSK modulator. Depending upon whether the data input at terminal 10 is a one or a zero, either an inverted or not inverted version of the spreading code sequence from sequence generator 54 will be fed to the modulator on conductor 51.

Figure 5:
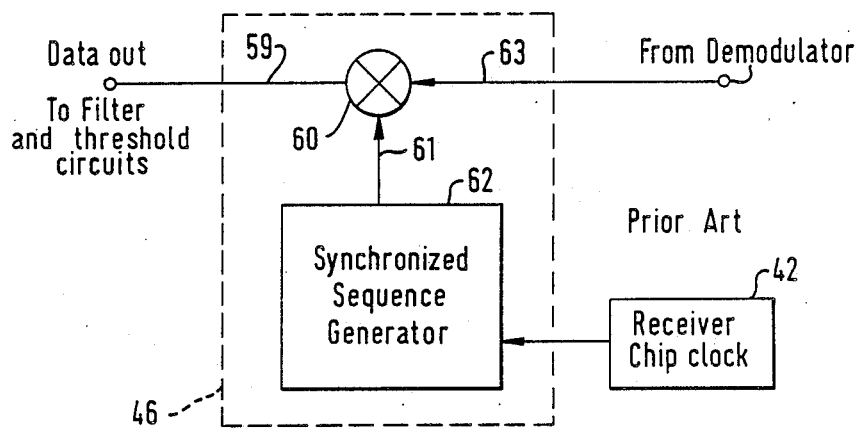
FIG. 5 is a prior art spread spectrum data correlator.

A prior art data correlator 46 is shown in FIG. 5. The data correlator consists of a four quadrant analog multiplier 60 having one input 63 from the demodulator and another input 61 connected to synchronized generator 52 which is driven by receiver chip clock 42. Methods of synchronizing the sequence generator 62 in the correlator with the sequence generator 54 in the encoder (FIG. 4) are well known in the prior art.

Data correlator 46 of FIG. 5 may also be implemented in digital form. If so, the signal input on conductor 63 is first digitized. The output of the synchronized sequence generator 62 would then be digital in nature. In the case of one bit quantization, the four quadrant multiplier 60 would be replaced with a two input exclusive OR gate. Alternatively, if the signal input on conductor 63 is digitized in an analog to digital converter having a plural bit parallel output, then multiplier 60 would then be replaced with a digital multiplier.

If the received code sequence on conductor 63 is the same as the synchronized code sequence on conductor 61, then the output on conductor 59 would indicate a zero data bit. Conversely, if the received code sequence on conductor 63 is the inverse of the synchronized code sequence on conductor 61, then the output on conductor 59 would indicate a one data bit.

It is noted that the sequence generator 62 at the receiver correlator 46 in FIG. 5 must be synchronized with the sequence generator 30 at the encoder 28 in FIG. 4. Such synchronization may take a long time to achieve and also may add a considerable amount of hardware.

Figure 6:
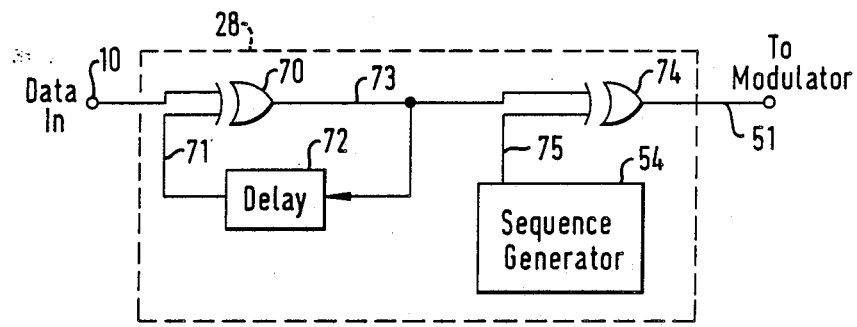
FIG. 6 is a spread spectrum data encoder in accordance with the present invention.

A data encoder in accordance with the present invention is shown in FIG. 6. The data encoder 28 includes a data input terminal 10 connected to one input terminal of an exclusive OR gate 70. The output of exclusive OR gate 70 at conductor 73 is connected to an input of a delay means 72. Delay means 72 may be implemented by using a shift register or other type of delay memory. The delay means 72 provides a signal delay substantially equal to the length of the spreading code sequence provided by sequence generator 54 on conductor 75. The output of delay means 72 on conductor 71 is input to the second input of exclusive OR gate 70.

The output of exclusive OR gate 70 on conductor 73 is one input to exclusive OR gate 74. The other input to exclusive OR gate 74 on conductor 75 is the output of the sequence generator 54. The resulting output of exclusive OR gate is the spread spectrum signal on conductor 51 which is applied to the modulator.

Figure 7:
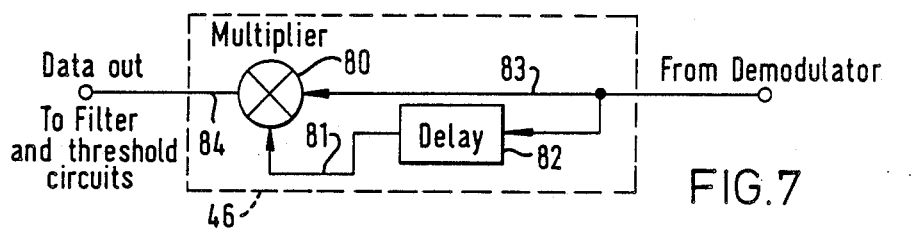
FIG. 7 is one embodiment of a spread spectrum data correlator in accordance with the present invention.

FIG. 7 shows an analog correlator 46 for receiving the spread spectrum signal from encoder 28 of FIG. 6. Correlator 46 consists of four quadrant multiplier 80 and delay means 82. Again, delay means 82, which may for example, be a charge coupled device (CCD), or other delay memory, provides a signal delay substantially equal to the length of one cycle of the spreading code sequence. The signal from the demodulator is applied to one input of the four quadrant multiplier 80 on conductor 83 and also to the input to the delay means 82. The other input of the four quadrant multiplier 80 is connected to the output of delay means 82 on conductor 81. The output of the four quadrant multiplier 80 on conductor 84 is the data output which is connected to the filter and threshold circuits 50 (from FIG. 3).

Figure 8:
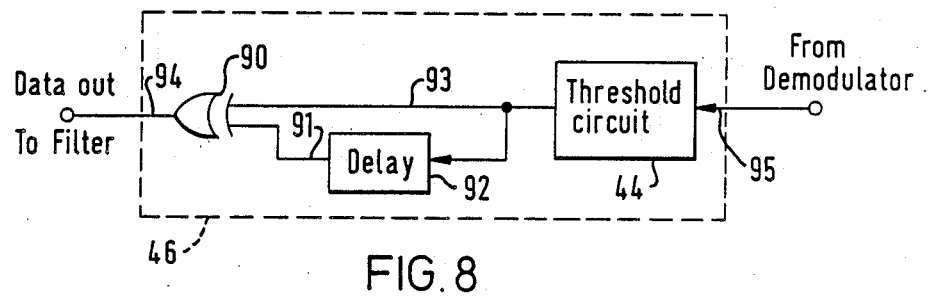
FIG. 8 is a second embodiment of a spread spectrum data correlator embodying the present invention.

A digital version of the data correlator of FIG. 7 is shown in FIG. 8. A threshold circuit 44 is used to digitize, i.e. one bit quantize, the signal coming from the demodulator on conductor 95. In lieu of analog multiplier, the digital data correlator of FIG. 8 includes an exclusive OR gate 90. The output of threshold circuit 44 on conductor 93 is connected to one input of exclusive OR gate 90 and also to the input of delay means 92. Again the delay means 92 which in the digital case may be a shift register, provides a delay substantially equal to one cycle of the spreading code sequence. The output of delay means 92 on conductor 91 is connected to the other input of exclusive OR gate 90. The output of exclusive OR gate 90 on conductor 94 is the data output to the remainder of the receiving system.

The four quadrant analog multiplier 80 as shown in FIG. 7 is analogous to the two input exclusive OR gate 90 shown in FIG. 8. This is true because the rules for multiplying signed numbers are analogous to the logic table for an exclusive OR gate function. That is, if the signal inputs to the multiplier 80 have the same polarity, i.e. are both positive or both negative, the output is positive. On the other hand, if the signal inputs are of opposite polarity, the output of multiplier 80 is negative. Thus, while an exclusive OR gate provides an indication of equality of logic level, a four quadrant multiplier provides an indication of equality of signal polarity.

In reference to the following discussion regarding the operation of the encoder and correlator, it is assumed that there is a transparent data path from conductor 51 of FIG. 6 to conductor 95 of FIG. 8. That is, it is assumed that the remainder of the transmission system, including the PSK modulator and PSK, and RF transmitter and RF receiver, will deliver the spread spectrum signal from conductor 51 of FIG. 6 to conductor 95 of FIG. 8.

In operation, the intended purpose of the encoder of figure 6 is to invert, or not invert, the polarity of each chip of the spreading code sequence, relative to the polarity of the corresponding chip of the spreading code sequence a fixed time delay previously, in accordance with the value of the input data. Specifically, if the present input data signal is a logic one, the polarity of the spreading code sequence, relative to the polarity of the spreading code sequence a fixed time delay previously, will be inverted; if the present input data signal is a zero, the encoder of FIG. 6 will not invert the polarity of the present chip of the spreading code sequence, relative to the polarity of the spreading code sequence a fixed time delay previously.

Exclusive OR gate 74 acts on the output of the spreading code sequence generator 54 to invert or not invert each chip of the spreading code sequence depending upon the value of an inversion control logic signal on conductor 73. Thus, if the signal on conductor 73 is a logic one, the present chip from the spreading code sequence from sequence generator 54 on conductor 75 is inverted at the output of exclusive OR 74 on conductor 51. Conversely, if the signal on conductor 73 is a logic zero, the present chip from the spreading code sequence from sequence generator 54 at the output on conductor 75 is not inverted.

The inversion control signal on conductor 73 is recorded in delay means 72 so that the previous inversion control signal, received a fixed time delay previously, is presented as one input to exclusive OR gate 70 on conductor 71. It can be seen that if the data at input terminal 10 is a logic one, then exclusive OR gate 70 inverts the previous inversion control signal to form the present inversion control signal, while if the data input is a logic zero, exclusive OR gate 70 does not invert the previous inversion control signal to form the present inversion control signal.

More specifically, if the previous chip (the corresponding chip of the previous cycle of the spreading code sequence) was inverted and the data input is a logic one, then the present chip is not inverted. If the previous chip was not inverted, and the data input is a logic one, then the present chip is inverted. If the previous chip was inverted, and the data input is a logic zero, then the present chip is also inverted. If the previous chip was not inverted, and the data input is a logic zero, then the present chip is also not inverted.

At the receiver, the signal input on conductor 95 of FIG. 8 is effectively digitized i.e., one bit quantized or bit sliced by threshold circuit 44 so that such signal appears in digital form on conductor 93.

Delay means 92 stores the individual received chips of the spread spectrum signal. The output of the delay means 92 is the corresponding chip of the previous spreading code sequence.

Now, exclusive OR gate 90 compares each received chip of the presently received spreading code sequence with a corresponding chip of the previously received spreading code sequence. Either the presently received chip of the spreading code sequence is the same as the previously received chip of the previously received sequence, in which case the received data is a logic zero, or it is the opposite of the previously received sequence, in which case the received data is a logic one.

In either event, the output of exclusive OR gate 90 on conductor 94 will be a series of comparisons one data bit in total length, one comparison for each chip of the spreading code sequence, the total number of comparisons being equal to the total number of chips per data bit. The analog correlator of FIG. 7 operates in a similar manner, by comparing the polarity of each chip of the received spreading code sequence to the polarity of a corresponding chip of the previously received spreading code sequence, and providing a first analog output indication (a positive signal) if the polarities are the same, and a second analog output indication (a negative signal) if the polarities are opposite.

Following the output of the data correlator 46 is a majority vote logic in order to determine whether the received data bit is a one or a zero. Under ideal conditions, all of the output chips over one data bit interval from exclusive OR 90 will be of the same polarity. In the presence of noise, some of them will be in error. However, by a majority vote of the output chips on conductor 94, improved communications reliability is achieved.

It is noted that data correlator 46 has no sequence generator at all. Therefore, there is no sequence generator to synchronize. Instead, synchronization is automatically achieved after one complete cycle of the spreading code sequence, i.e. once delay register 92 is filled.

As noted above, the number of chips per data bit need not equal the number of chips per spreading code sequence. However, as long as the delay memory 72 in the encoder (FIG. 6) and the delay memory 82, 92 in the correlator (FIGS. 7,8), provide respective delays substantially equal to the number of chips in the spreading code sequence, differential encoding and differential correlation will provide a data path through the spread spectrum system.

Thus, a simple economical data correlator and data encoder has been described for use in conjunction with a spread spectrum communication system. The described system is low in cost and will rapidly synchronize with the received spread spectrum signal.

What is claimed is:

1. In a spread spectrum communication system including a spread spectrum signal having a spreading code sequence differentially encoded in accordance with an input data signal, a data correlator comprising:
   an input terminal for receiving said spread spectrum signal;
   an output terminal;
   differential decoding means, coupled to said input terminal for determining whether at least one chip of the presently received spread spectrum spreading code sequence at said input terminal and at least one chip of a previously received spread spectrum spreading code sequence are substantially equal;
   said differential decoding means further providing a first logic level output at said output terminal when said chip of said presently received spread spectrum spreading code sequence and said chip of said previously received spread spectrum spreading code sequence are substantially equal; and
   said differential decoding means further providing a second logic level output at said output terminal when said chip of said presently received spread spectrum spreading code sequence and of said chip of said previously received spread spectrum spreading code sequence are substantially not equal.

2. A spread spectrum communication system in accordance with claim 1, wherein said differential decoding means comprises:
   an exclusive OR gate having first and second input terminals and an output terminal, said input terminal for receiving said spread spectrum signal being coupled to said first input terminal of said exclusive OR gate;
   delay means having input and output terminals, said input terminal of said delay means being coupled to said input terminal for receiving said spread spectrum signal, said output terminal of said delay means being coupled to said second input terminal of said exclusive OR gate; and
   said output terminal coupled to said output terminal of said exclusive OR gate.

3. A data correlator in accordance with claim 2, wherein the time delay provided by said delay means is essentially equal to the time duration of one cycle of said spread spectrum spreading code sequence.

4. In a spread spectrum communication system including a spread spectrum signal having a spreading code sequence differentially encoded in accordance with an input data signal, a data correlator comprising:
   an input terminal for receiving said spread spectrum signal;
   an output terminal;
   differential decoding means, coupled to said input terminal for determining whether at least one chip of the presently received spread spectrum spreading code sequence at said input terminal and at least one chip of the previously received spread spectrum spreading code sequence are of the same polarity;
   said differential decoding means further providing a first analog signal output indication at said output terminal when said chip of said presently received spread spectrum spreading code sequence and said chip of said previously received spread spectrum spreading code sequence are of the same polarity; and
   said differential decoding means further providing a second analog signal output indication at said output terminal when said chip of said presently received spread spectrum spreading code sequence and said chip of said previously received spread spectrum spreading code sequence are of opposite polarity.

5. A spread spectrum communication system in accordance with claim 4, wherein said differential decoding means comprises:
   an analog multiplier having first and second input terminals and an output terminal, said input terminal for receiving said spread spectrum signal being coupled to said first input terminal of said analog multiplier;
   analog delay means having an input and an output terminal, the input terminal of said analog delay means being coupled to said input terminal for receiving said spread spectrum signal, and the output terminal of said analog delay means being coupled to the second input terminal of said analog multiplier means; and
   said output terminal coupled to said output terminal of said analog multiplier.

6. A data correlator in accordance with claim 5, wherein said time delay provided by said analog delay means is essentially equal to the time duration of one cycle of said spread spectrum spreading code sequence.

7. In a spread spectrum communication system including a spread spectrum signal having a spreading code sequence differentially encoded in accordance with an input data signal, a method for correlating said data signal on said spread spectrum signal comprising:

determining whether at least one chip of the presently received spread spectrum spreading code sequence and at least one chip of the previously received spread spectrum spreading code sequence are substantially equal;

providing a first output signal indication when said chip of said presently received spread spectrum spreading code sequence and said chip of said previously received spread spectrum spreading code sequence are substantially equal; and providing a second output signal indication when said chip of said presently received spread spectrum spreading code sequence and said chip of said previously received spread spectrum spreading code sequence are substantially not equal.

8. A method for correlating a spread spectrum signal in accordance with claim 7, wherein the said step of determining whether at least one chip of said presently received spread spectrum spreading code sequence and at least one chip of said previously received spread spectrum spreading code sequence are substantially equal, further comprises:

storing the previously received spread spectrum spreading code sequence in a delay memory; and calculating the exclusive OR of at least one chip of said presently received spread spectrum spreading code sequence, and at least one chip of said stored spread spectrum spreading code sequence.

9. A method for correlating a spread spectrum signal in accordance with claim 7, wherein the said step of determining whether at least one chip of said presently received spread spectrum spreading code sequence and at least one chip of said previously received spread spectrum spreading code sequence are substantially equal, further comprises:

storing the previously received spread spectrum spreading code sequence in a delay memory; and calculating the product of at least one chip of said presently received spread spectrum spreading code sequence, and at least one chip of said stored spread spectrum spreading code sequence.

* * * * *